United States Patent
Satake

(10) Patent No.: US 9,909,793 B2
(45) Date of Patent: Mar. 6, 2018

(54) EXPANSION VALVE AND VIBRATION-PROOF SPRING

(71) Applicant: TGK CO., LTD., Tokyo (JP)

(72) Inventor: Ryosuke Satake, Tokyo (JP)

(73) Assignee: TGK CO., LTD., Tokyo (JP)

( * ) Notice: Subject to any disclaimer, the term of this patent is extended or adjusted under 35 U.S.C. 154(b) by 611 days.

(21) Appl. No.: 14/203,460

(22) Filed: Mar. 10, 2014

(65) Prior Publication Data

US 2014/0261765 A1 Sep. 18, 2014

(30) Foreign Application Priority Data

Mar. 12, 2013 (JP) .................................. 2013-048731

(51) Int. Cl.
| | |
|---|---|
| F25B 41/06 | (2006.01) |
| F16F 7/00 | (2006.01) |
| F16F 1/02 | (2006.01) |

(52) U.S. Cl.
CPC ............ *F25B 41/062* (2013.01); *F16F 1/025* (2013.01); *F25B 2341/0683* (2013.01); *F25B 2500/13* (2013.01); *Y10T 137/6579* (2015.04)

(58) Field of Classification Search
CPC ................ F25B 41/062; F25B 2500/13; F25B 2341/0683; F16F 1/025; Y10T 137/6579
USPC .................................................. 267/161, 163
See application file for complete search history.

(56) References Cited

U.S. PATENT DOCUMENTS

| | | | | |
|---|---|---|---|---|
| 1,958,120 | A * | 5/1934 | Tuxbury ................. | F16C 33/74 267/161 |
| 2,152,781 | A * | 4/1939 | Wile ...................... | F25B 41/062 137/505.42 |
| 3,259,383 | A * | 7/1966 | Johnson .................. | F16B 43/00 267/161 |

(Continued)

FOREIGN PATENT DOCUMENTS

| | | | | |
|---|---|---|---|---|
| CN | 1699802 A | 11/2005 | ............... | F16K 1/00 |
| CN | 101101065 A | 1/2008 | ............... | F16K 1/14 |

(Continued)

OTHER PUBLICATIONS

Notification of Reason(s) for Refusal Patent Appln. No. 2013-048731 Dispatch No. 317013, Dispatch date Jul. 19, 2016.

(Continued)

*Primary Examiner* — Kun Kai Ma
(74) *Attorney, Agent, or Firm* — Martine Penilla Group, LLP

(57) ABSTRACT

An expansion valve includes a vibration-proof spring that develops the sliding resistance by biasing a shaft. The vibration-proof spring includes a base portion constituted by a circular plate having a hole, through which the actuating rod can be inserted, in the central region, a plurality of spring portions, which is installed upright on the base portion and which is so formed as to come in contact with the periphery of the actuating rod, and a plurality of supporting pieces, which extend outward from the base portion and which is formed so that the supporting pieces can be stopped by the body. The supporting piece is structured such that the supporting piece includes a low-rigidity portion whose rigidity is lower than that of the base portion.

6 Claims, 7 Drawing Sheets

(56) References Cited

U.S. PATENT DOCUMENTS

| | | | | |
|---|---|---|---|---|
| 4,542,852 A * | 9/1985 | Orth | ...................... | F25B 41/062 188/381 |
| 6,164,187 A * | 12/2000 | Stojic | ................... | B60T 17/083 92/63 |
| 6,296,194 B1 * | 10/2001 | Hirota | .................. | F25B 41/062 236/92 B |
| 8,602,656 B2 * | 12/2013 | Mashino | ............... | F16C 25/083 267/161 |
| 8,991,570 B2 * | 3/2015 | Ashiba | ................. | F16F 9/3485 188/282.8 |
| 2002/0185621 A1 * | 12/2002 | Kobayashi | ............ | G01T 1/2014 250/585 |
| 2003/0010834 A1 * | 1/2003 | Yano | ..................... | F25B 41/062 236/92 B |
| 2003/0079493 A1 * | 5/2003 | Hirota | .................. | F25B 41/062 62/474 |
| 2004/0079810 A1 * | 4/2004 | Kobayashi | ............ | F25B 41/062 236/92 B |
| 2005/0252238 A1 * | 11/2005 | Kobayashi | ............ | F16K 31/002 62/527 |
| 2006/0117774 A1 * | 6/2006 | Ise | ........................ | F25B 41/062 62/222 |
| 2008/0136075 A1 * | 6/2008 | Imaizumi | ............ | F16D 25/0638 267/161 |
| 2008/0251742 A1 * | 10/2008 | Ise | ........................ | F25B 41/062 251/11 |
| 2011/0120161 A1 * | 5/2011 | Hayashi | ................ | F25B 41/062 62/160 |
| 2013/0160875 A1 * | 6/2013 | Schriner | ................ | F16K 15/03 137/529 |
| 2013/0206851 A1 * | 8/2013 | Sekiguchi | ............... | F16K 31/04 236/92 B |
| 2013/0283836 A1 * | 10/2013 | Satake | .................. | F25B 41/062 62/225 |
| 2014/0064944 A1 * | 3/2014 | Li | .......................... | F16F 1/324 415/182.1 |

FOREIGN PATENT DOCUMENTS

| | | | | |
|---|---|---|---|---|
| CN | 201426637 Y | 3/2010 | ............ | A47J 27/092 |
| CN | 102588669 A | 7/2012 | ............. | F16K 47/00 |
| EP | 1 857 747 A1 | 11/2007 | ............. | F25B 41/06 |
| JP | S4612567 Y1 | 5/1971 | | |
| JP | H08145505 A | 6/1996 | | |
| JP | 2008-014628 | 1/2008 | | |
| JP | 200814628 A | 1/2008 | | |
| JP | 2008014628 A * | 1/2008 | | |
| WO | WO2006090826 A1 | 8/2006 | | |

OTHER PUBLICATIONS 201410088037.4, Notification of First Office Action, Chinese Language, dated Feb. 3, 2017, TGK Co., Ltd.
201410088037.4, Notification of First Office Action, English Language, dated Feb. 3, 2017, TGK Co., Ltd.

* cited by examiner

EXPANSION VALVE AND VIBRATION-PROOF SPRING

CLAIM OF PRIORITY TO RELATED APPLICATION

The present application is claiming priority of Japanese Patent Application No. 2013-048731, filed on Mar. 12, 2013, the content of which is incorporated herein by reference.

BACKGROUND OF THE INVENTION

1. Field of the Invention

The present invention relates to an expansion valve and, more particularly to a structure of a vibration-proof spring suitable in preventing the vibration of an actuating portion of the expansion valve.

2. Description of the Related Art

A refrigeration cycle in an automotive air conditioner is generally configured such that it includes a compressor, a condenser, a receiver, an expansion valve, and an evaporator. The compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. Then the evaporator evaporates the misty refrigerant and thereby cools the air inside a vehicle by the evaporative latent heat.

Used as the expansion valve is a thermostatic expansion valve which senses the temperature and pressure of refrigerant in an outlet side of the evaporator such that the refrigerant delivered from the evaporator has a predetermined degree of superheat and which controls the flow rate of refrigerant delivered to the evaporator by opening and closing a valve section. This thermostatic expansion valve includes a body formed with a first passage for passing the refrigerant flowing from the receiver to the evaporator and a second passage for passing the refrigerant returning from the evaporator and supplying the refrigerant to the compressor. A valve hole is formed midway in the first passage. And a valve element is provided such that the flow rate of refrigerant flowing to the evaporator is regulated by touching and leaving the valve hole. Provided at an end of the body is a power element that senses the temperature and pressure of refrigerant flowing through the second passage and controls the valve opening degree of the valve section. The drive force of the power element is transmitted to the valve element by way of an elongated shaft. The shaft extends in such a manner as to move across the second passage and reaches the first passage and is slidably supported by an insertion hole formed in a partition that separates the first passage from the second passage.

In such an expansion valve as described above, the pressure may fluctuate in an upstream side of the valve section where a high-temperature refrigerant is introduced. If this problem of fluctuation is left unattended, the valve element may vibrate and generate noise. In the light of such problems, the following method is often employed. That is, the biasing force of a spring is applied to a shaft from its lateral side so that the valve element does not respond sensitively to the fluctuation in pressure, thereby stabilizing the operation of the valve element. For example, a vibration control means, which is constituted by a plurality of plate springs, is set between a body and a shaft and then the shaft is circularly surrounded by these spring plates. In this example, a sliding load is applied to the shaft, thereby suppressing the vibration of the shaft and the valve element (see Reference (1) in the following Related Art List, for instance). The control means cited in Reference (1) has a plurality of first plate springs, which are so formed as to circularly surround the shaft, and a plurality of second plate springs, which are formed to secure the vibration control means against a holding hole formed in the body. The vibration control means is secured against the body by press-fitting the second plate springs such that the second plate springs can be bent in accordance with the holding hole.

RELATED ART LIST (1) Japanese Unexamined Patent Application Publication (Kokai) No. 2008-014628.

As described above, the vibration control means cited in Reference (1) is configured such that the first plates are also formed in a disk part where the second plates are formed. Accordingly, when the vibration control means is press-fitted to the holding hole of the body, the load acting on the second plates when it is press-fitted thereto is exerted on the disk part as well and therefore the disk part may possibly be deformed. If the disk part is deformed, the position of the first plate springs will be changed and displaced from the original steady position and thereby the balance of the sliding load in between each of the first plate springs applied to the shaft will be more likely to be lost. As a result, there are cases where the sliding of the shaft gets unstable and it becomes hard to control the vibration of the shaft. Also, sufficient consideration is required so that the deformation of the disk part can be minimized when the vibration control means is press-fitted thereto. This makes the assembly work take longer and complicated.

SUMMARY OF THE INVENTION

The present invention has been made in view of the foregoing problems, and a purpose thereof is to provided an expansion valve and a vibration-proof spring capable of being assembled with easy work while the function of the vibration-proof spring suitable in preventing the vibration of an actuating portion of the expansion valve is ensured.

In order to resolve the aforementioned problems, in an expansion valve that throttles and expands refrigerant introduced from an upstream side of a refrigeration cycle by allowing the refrigerant to pass through a valve section in a body so as to deliver the refrigerant to a downstream side thereof, the expansion valve includes: the body having: (1) a refrigerant passage, which is formed in such a manner as to run through the body, having a lead-in port of the refrigerant at one end thereof and having a lead-out port of the refrigerant at the other end thereof; and (2) a valve hole provided midway along the refrigerant passage; a valve element for opening and closing the valve section by moving toward and away from the valve hole; a drive section for generating drive force used to open and close the valve section; an actuating rod, supported by the body, for transmitting the drive force of the drive section to the valve element; and a vibration-proof spring, which is set between the body and the actuating rod, for developing a sliding resistance by biasing the actuating rod. The vibration-proof spring includes: a base portion comprised of a plate having a hole, through which the actuating rod is insertable, in a central region; a plurality of spring portions, which are installed upright on the base portion and which are so formed as to come in contact with a periphery of the actuating rod; and a plurality of supporting pieces, which extend outward from the base portion and which is so formed as to be stoppable by the body, wherein the supporting piece is structured such that the supporting piece includes a low-rigidity portion whose rigidity is lower than that of the base portion.

By employing this embodiment, the supporting piece, which has been so formed as to be stoppable by the body, includes the low-rigidity portion whose rigidity is lower than that of the base portion. Thus, when the vibration-proof spring is assembled to the body and when a load is applied to the supporting piece by the press-fitting or the like, the supporting piece is first deformed before the base portion is deformed. The deformation in the low-rigidity portion absorbs the load applied to the supporting piece and thereby the load applied thereto is less likely to be transmitted to a base portion side. That is, the low-rigidity portion can suppress the load applied to the supporting piece from deforming the base portion. As a result, the load applied to the supporting piece does not adversely affect the position or bearing of the spring portion provided upright on the base portion, and each spring portion can apply an appropriate sliding load to the actuating rod inserted to the hole. Also, the low-rigidity portion suppresses the load applied to the supporting piece from deforming the base portion. As a result, much attention otherwise directed to the deformation of the base portion when the vibration-proof spring is assembled to the body can be reduced to the minimum and therefore the assembling work of the vibration-proof spring is done easily.

Another embodiment of the present invention relates to a vibration-proof spring. The vibration-proof spring includes: a base portion comprised of a circular plate having a hole in a central region; a plurality of spring portions, which are installed upright on the base portion and which extend along an axis line of the hole; and a plurality of supporting pieces, which extend outward from the base portion. The supporting piece is structured such that the supporting piece includes a low-rigidity portion whose rigidity is lower than that of the base portion.

By employing this embodiment, the supporting piece includes the low-rigidity portion whose rigidity is lower than that of the base portion. Thus, when a load is applied to the supporting piece, a deformation in the low-rigidity portion absorbs the load applied to the supporting piece and thereby the load applied thereto is less likely to be transmitted to a base portion side. As a result, the low-rigidity portion can suppress the load applied to the supporting piece from deforming the base portion. In other words, the load applied to the supporting piece does not adversely affect the position of the spring portion provided upright on the base portion, and each spring portion can apply an appropriate sliding load to a member inserted to the hole. Also, the low-rigidity portion suppresses the load applied to the supporting piece from deforming the base portion. As a result, much attention otherwise directed to the deformation of the base portion when the vibration-proof spring is assembled to that which is to be assembled can be reduced to the minimum and therefore the assembling work of the vibration-proof spring is done easily.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
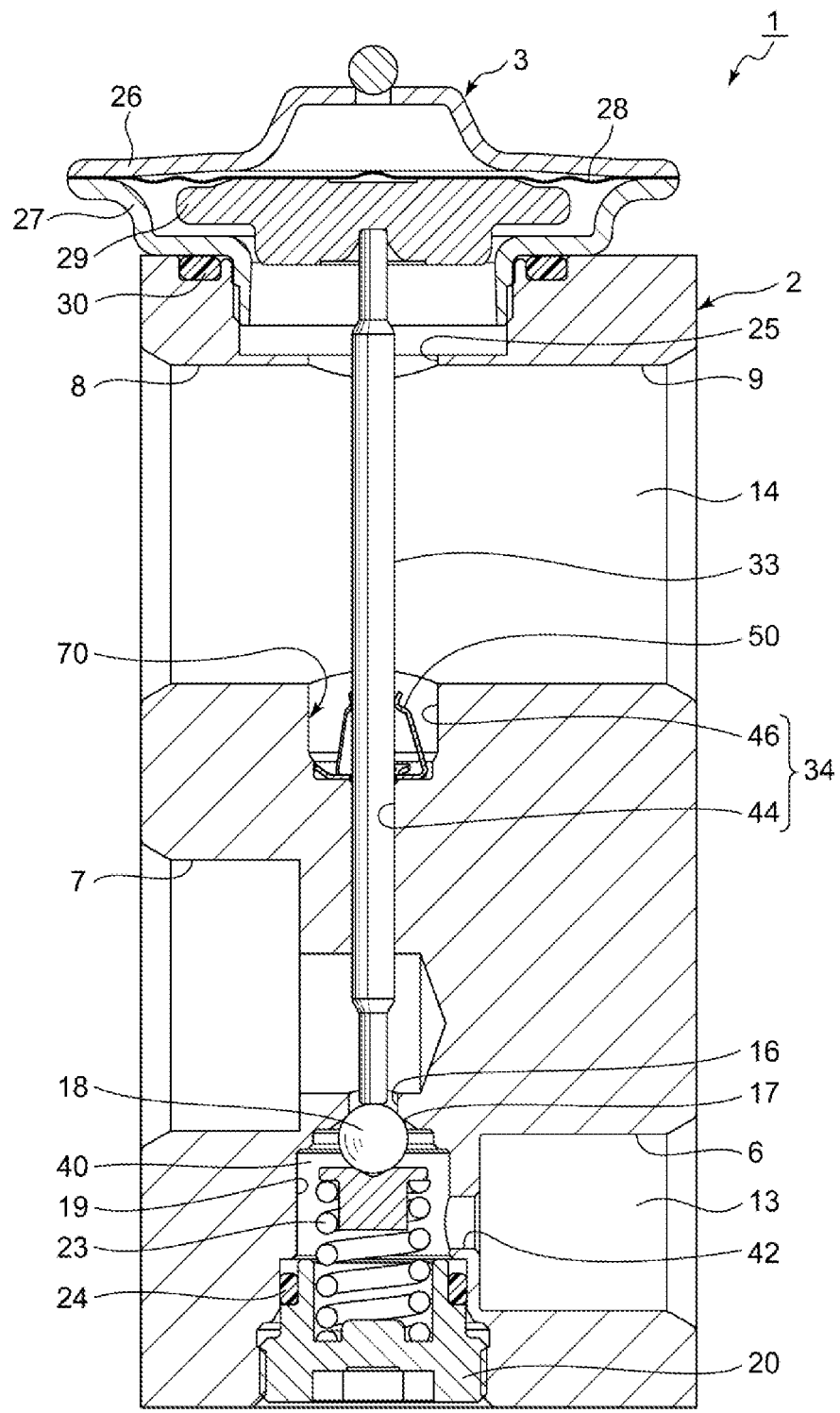
FIG. 1 is a cross-sectional view of an expansion valve according to a first embodiment of the present invention.

The present invention will now be described in detail based on preferred embodiments with reference to the accompanying drawings. This does not intend to limit the scope of the present invention, but to exemplify the invention. All of the features and the combinations thereof described in the embodiment are not necessarily essential to the invention.

In the following description, for convenience of description, the positional relationship between each component may be expressed with reference to how each component is depicted in Figures. Note that the almost identical components are given the identical reference numerals in the following embodiments and their modifications and that the repeated description thereof will be omitted as appropriate.

First Embodiment

The present embodiment is a constructive reduction to practice of the present invention where an expansion valve according to the preferred embodiments is used in a specific manner as a thermostatic expansion valve applied to a refrigeration cycle of an automotive air conditioner. The refrigeration cycle in the automotive air conditioner is configured by including a compressor, a condenser, a receiver, an expansion valve, and an evaporator. Here, the compressor compresses a circulating refrigerant; the condenser condenses the compressed refrigerant; the receiver separates the condensed refrigerant into a gas and a liquid; the expansion valve throttles and expands the separated liquid refrigerant and delivers it by turning it into a spray; the evaporator evaporates the misty refrigerant and thereby cools the air inside a vehicle by the evaporative latent heat. Note that a detailed description of components except for the expansion valve is omitted in the following.

FIG. 1 is a cross-sectional view of an expansion valve according to a first embodiment of the present invention.

An expansion valve 1 has a body 2 formed such that a member, which has been formed such that a raw material made of an aluminum alloy undergoes extrusion molding, is subjected to a predetermined cutting work. This body 2, which is prismatic in shape, for instance, is provided with a valve section that throttles and expands a refrigerant. A power element 3, which functions as a temperature-sensing section, is provided at a longitudinal end of the body 2. Here, the temperature-sensing section is a drive section that senses the temperatures and then becomes activated.

The body 2 has sides formed with a lead-in port 6 and a lead-out port 7. The lead-in port 6 receives a high-temperature and high-pressure liquid refrigerant from a receiver side (condenser side). The lead-out port 7 supplies a low-temperature and low-pressure refrigerant, which has been throttled and expanded by the expansion valve 1, to the evaporator. Also, the body 2 has the sides formed further with a lead-in port 8 and a lead-out port 9. The lead-in port 8 receives the refrigerant evaporated by the evaporator. The lead-out port 9 returns the refrigerant, which has passed through the expansion valve 1, to a compressor side. A screw hole (omitted in FIG. 1), through which a not-shown stud bolt used to mount the piping can be studded, is formed between the lead-in port 6 and the lead-out port 9.

In the expansion valve 1, a first passage 13 is configured by the lead-in port 6, the lead-out port 7, and a refrigerant passage connecting them. A valve section is provided in a middle part of the first passage 13. The refrigerant introduced from the lead-in port 6 is throttled and expanded through this valve section and then turned into a spray so as to be supplied to the evaporator from the lead-out port 7. Also, a second passage 14, which corresponds to a "return passage", is configured by the lead-in port 8, the lead-out port 9, and a refrigerant passage connecting them. The second passage 14 extends straight, and the refrigerant is led in from the lead-in port 8 and delivered to the compressor from the lead-out port 9 through this second passage 14.

In other words, a valve hole 16 is provided in a middle part of the first passage 13 in the body 2, and a valve seat 17 is formed by an opening end edge on a lead-in port 6 side of the valve hole 16. A valve element 18 is so placed as to face the valve seat 17 from a lead-in port 6 side. The valve element 18 is constructed such that a spherical ball valve element, which opens and closes the valve section by touching and leaving the valve seat 17, is joined to a valve element support that supports the ball valve element from below.

In a lower end part of the body 2, a communication hole 19, which communicates to and from the body 2, is formed in a direction orthogonal to the first passage 13, and a valve chamber 40, which houses the valve element 18, is formed by an upper half of the communication hole 19. The valve chamber 40 communicates to the valve hole 16 at an upper end of the valve chamber 40, whereas the valve chamber 40 communicates to the lead-in port 6 on a lateral side of the valve chamber 40 through a small hole 42 and constitutes a part of the first passage 13. The small hole 42 is formed such that the cross section of the part of the first passage 13 is locally narrowed down, and the small hole 42 is open into the valve chamber 40.

In a lower half of the communication hole 19, an adjustment screw 20 is screwed in such a manner as to seal the communication hole 19 from the outside. A spring 23, which biases the valve element 18 in a valve closing direction, is set between the valve element 18 (more precisely, the valve element support) and the adjustment screw 20. The spring load of the spring 23 can be adjusted by a screwing amount of the adjustment screw 20 into the body 2. An O-ring 24 used to prevent the leakage of refrigerant is set between the adjustment screw 20 and the body 2.

In an upper end part of the body 2, a communication hole 25, which communicates to and from the body 2, is formed in a direction orthogonal to the second passage 14, and the power element 3 is screwed in such a manner as to seal the communication hole 25. The power element 3 is configured such that a diaphragm 28 formed of a sheet metal is held between an upper housing 26 and a lower housing 27 and such that a disk 29 is disposed on a lower housing 27 side. A gas used to sense the temperature is filled and sealed in a hermetically sealed space enclosed by the upper housing 26 and the diaphragm 28. An O-ring 30 by which to prevent the leakage of refrigerant is set between the power element 3 and the body 2. The pressure and temperature of refrigerant passing through the second passage 14 are transmitted to an underside of the diaphragm 28 by way of grooves provided in the disk 29.

A stepped hole 34 that connects the first passage 13 to the second passage 14 is provided in a central part of the body 2, and an elongated shaft 33 (which functions as an "actuating rod") is slidably inserted into a smaller-diameter hole 44 of the stepped hole 34. The shaft 33 is set between the disk 29 and the valve element 18. With this arrangement, a drive force generated by a displacement of the diaphragm 28 is transmitted to the valve element 18 by way of the disk 29 and the shaft 33 so as to open and close the valve section.

An upper half of the shaft 33 moves across the second passage 14, whereas a lower half of the shaft 33 slidably penetrates the smaller-diameter hole 44 of the stepped hole 34. A larger-diameter hole 46 of the stepped hole 34 also functions as a holding hole 70. Here, the holding hole 70 holds and contains a vibration-proof spring 50 by which to exert a biasing force in a direction vertical to the direction of axis line on the shaft 33, namely by which to exert lateral load (sliding load) on the shaft 33. As the shaft 33 receives the lateral load of the vibration-proof spring 50, the vibration of the shaft 33 and the valve element 18 produced by the fluctuation in the refrigerant pressure is suppressed or inhibited. A detailed structure of the vibration-proof spring 50 and a detailed structure of the holding hole 70 will be described later.

The expansion valve 1 as configured above senses the pressure and the temperature of the refrigerant that has been brought back from the evaporator via the lead-in port 8 and thereby the diaphragm 28 develops a displacement. The displacement developed by the diaphragm 28 becomes the drive force and is then transmitted to the valve element 18 via the disk 29 and the shaft 33, thereby opening and closing the valve section. Also, the liquid refrigerant supplied from the receiver is introduced from the lead-in port 6 and then passes through the valve section. Having thus passing through the valve section throttles and expands the liquid refrigerant, thereby turned it into a low-temperature and low-pressure misty refrigerant. This misty refrigerant is delivered toward the evaporator from the lead-out port 7.

Figure 2A:
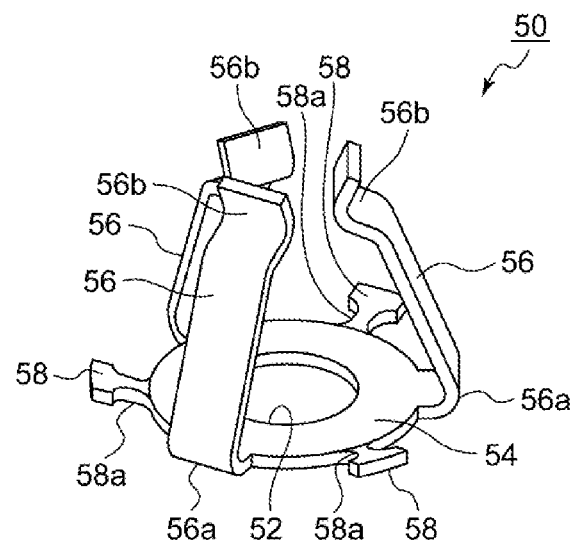
FIGS. 2A to 2C each shows a structure of a vibration-proof spring according to a first embodiment.
Figure 2B:
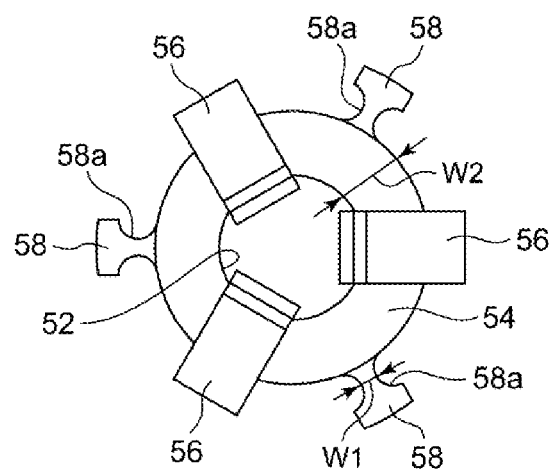
Figure 2C:
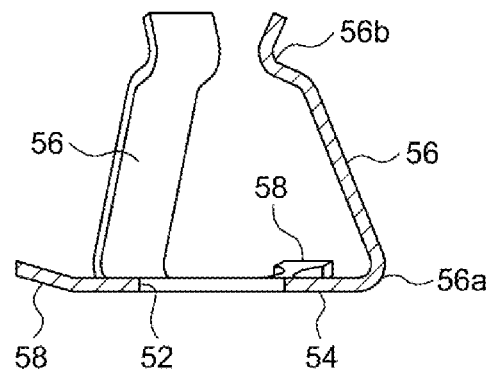

A description is now given of a specific structure of the vibration-proof spring 50. FIGS. 2A to 2C each shows a structure of a vibration-proof spring. FIG. 2A is a perspective view showing an overall structure of the vibration-proof spring 50. FIG. 2B is a plain view of the vibration-proof spring 50. FIG. 2C is a cross-sectional view of the vibration-proof spring 50.

As shown in FIGS. 2A to 2C, the vibration-proof spring 50 is comprised of a base portion 54, which is formed of a circular annular plate, having a hole 52 in a central region, a plurality of spring portions 56, which are installed upright on the base portion 54, and a plurality of supporting pieces 58, which extend outward from the hole 54. In the example shown in FIGS. 2A to 2C, three spring portions 56, which are installed upright from an outer edge portion of the base portion 54, are spaced equally at intervals of 120 degrees, for instance. The supporting piece 58 is arranged at an intermediate position of two spring portions 56. Thus, in the example shown in FIGS. 2A to 2C, three supporting pieces 58 are so formed as to be spaced equally from each other, too.

The vibration-proof spring 50 can be formed such that a plate spring material, which is a thin stainless steel plate (steel strip) or the like, is subjected to a punching process and is then bent.

The spring portions 56 are formed together with the base portion 54 when the plate spring material undergoes the punching process. The spring portion 56 is bent upward 120 degrees relative to the base portion 54 from a spring base part 56a when the plate spring material is bent, and then a tip part 56b is bent into a substantially C-shape or the like in cross section such that the tip part 56b protrudes toward an axis line of the hole 52. With this structure and design, the tip part 56b of each spring portion 56, namely the apex of a C-shape curvature, is substantially in point-contact with a periphery of the shaft 33, when the shaft 33 (see FIG. 1) is inserted into the hole 52. And at the same time, an elastic force generated by the bending state at the spring base part 56a can bias the periphery of the shaft 33. In the case of FIGS. 2A to 2C, three spring portions 56 are formed and therefore the shaft 33 is supported by uniform biasing forces from three directions at equal intervals spaced apart and receives the sliding load. Also, since a sliding part between the shaft 33 and each spring portion 56 is substantially a point contact by the tip part 56b, the contact states are more likely to be stabilized and variations in the biasing force, namely the variations in the sliding load, can be suppressed. It is desirable that the size of the vibration-proof spring 50 and the size of the holding hole 70 are designed such that the spring base part 56a (a bent part in particular) does not come in contact with the holding hole 70 when the vibration-proof spring 50 is assembled to the holding hole 70 of the expansion valve 1. This structure and arrangement can further suppress the variations in the biasing force of the spring portion 56 relative to the shaft 33.

The supporting pieces 58 are also formed simultaneously with the base portion 54 when the plate spring material undergoes the punching process. A predetermined rigidity is required for the supporting piece 58 in order that the supporting piece 58 can achieve a function of supporting and securing the vibration-proof spring 50 in the holding hole 70 (see FIG. 1). Note, however, that the supporting piece 58 according to the first embodiment is structured such that the supporting piece 58 includes a low-rigidity portion 58a whose rigidity is lower than that of the base portion 54. As shown in FIG. 2B, the low-rigidity portion 58a can be formed as follows. That is, for example, the supporting piece 58 is so structured as to contain a part, which corresponds to the low-rigidity portion 58a, where a width W1 in a direction perpendicular to a direction of extension of the supporting piece 58 (a radially outward direction of the base portion 54) is narrower than a plate width W2 of the base portion 54 lateral to the hole 52. In the case of FIGS. 2A to 2C, the low-rigidity portion 58a is formed such that a near-base part of the supporting piece 58 is cut out in a semicircular shape, for instance.

Figure 3A:
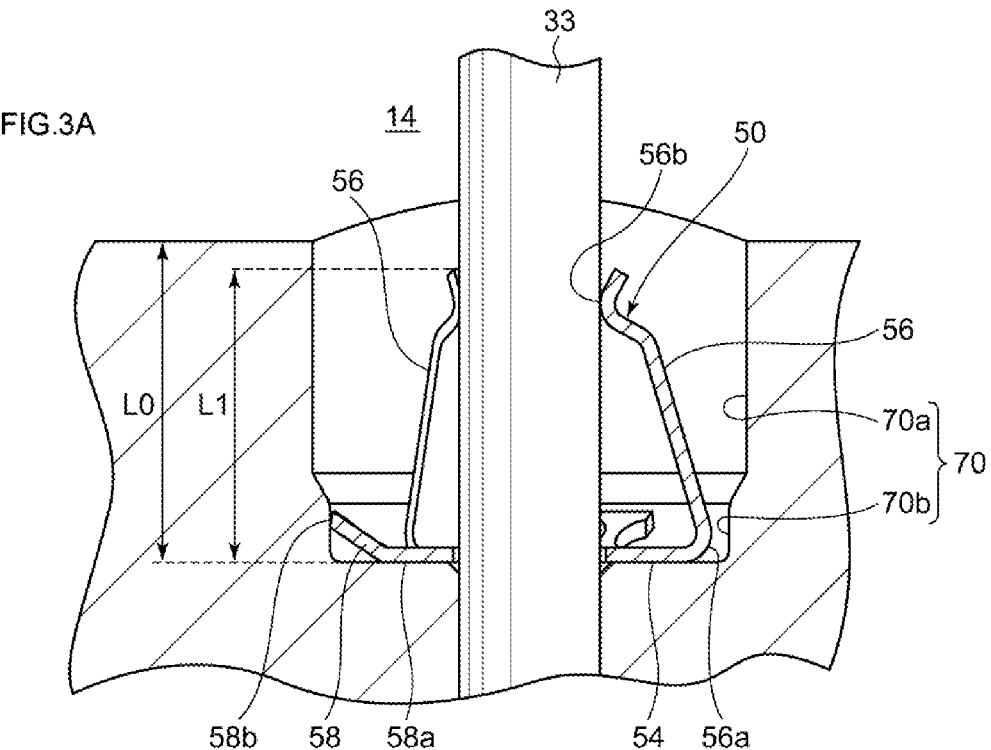
FIGS. 3A and 3B are diagrams for explaining a relationship between a holding hole and a vibration-proof spring in an expansion valve according to a first embodiment.
Figure 3B:
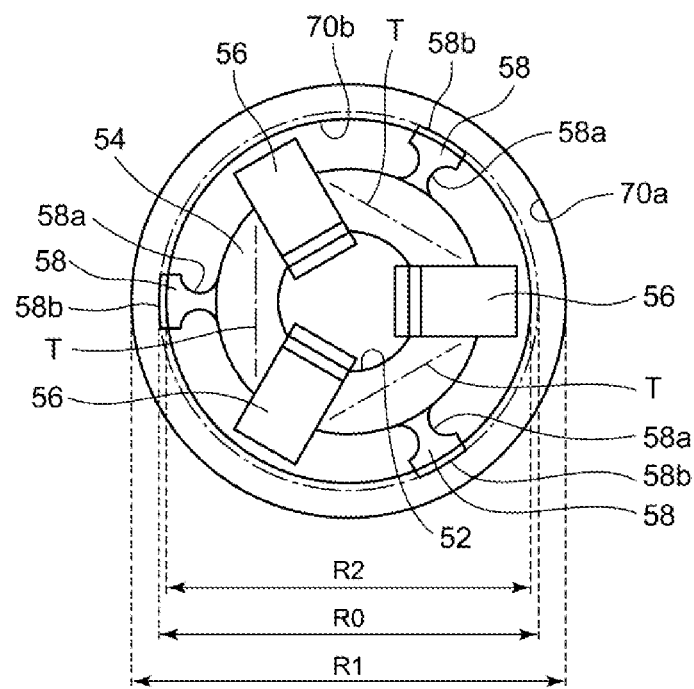

The shape and function of the low-rigidity portion 58a are described with reference to FIGS. 3A and 3B. FIG. 3A is a diagram for explaining a state where the vibration-proof spring 50 is fixed in the holding hole 70, which has been drilled in the body 2 of the expansion valve 1, and the vibration-proof spring 50 applies the biasing force to the shaft 33.

As shown in FIG. 1, the holding hole 70 is formed such that there is an opening end in the second passage 14 (return passage) and such that the holding hole 70 has a diameter and a depth within which the vibration-proof spring 50 can be held. As described earlier, the vibration-proof spring 50 needs to be tightly fixed in the holding hole 70. Accordingly, in the first embodiment, the vibration-proof spring 50 is fixed in the holding hole 70 by the press-fitting. As shown in FIG. 1, the stepped hole 34 formed in the body 2 is formed by the larger-diameter hole 46 and the smaller-diameter hole 44, and the larger-diameter hole 46 functions as the holding hole 70 that holds the vibration-proof spring 50. In consideration of a placement work necessary for the vibration-proof spring 50, the holding hole 70 is formed in a stepped shape having a press-fitting region, where the press-fitting can be done in a depth direction of the holding hole 70, and a non-press-fitting region. More specifically, as shown in FIG. 3B, the holding hole 70 is so formed as to include a larger-diameter part 70a and a smaller-diameter part 70b, which is provided in a position of the holding hole deeper than the larger-diameter part 70a (provided on a spring seat side of the vibration-proof spring 50 in FIG. 3A). Here, the larger-diameter part 70a has a diameter R1 that is greater than or equal to an outer edge diameter R0 connecting an outer edge part 58b of the vibration-proof spring 50 before the press-fitting, whereas the smaller-diameter part 70b has a diameter R2 that is less than the diameter of the larger-diameter part 70a. That is, $R1 \geq R0 > R2$.

When a component, such as the vibration-proof spring, which is generally formed of thin-plate material or sheet material is press-fitted to the holding hole, a resistance force in a direction opposite to the press-fitting direction works on a part of said component in contact with an inner wall surface of the hole and therefore said component is press-fitted while it is being elastically deformed. Here, consider a case where a vibration-proof spring has no low-rigidity portion 58a unlike the case of vibration-proof spring 50 having the low-rigidity portion 58a according to the first embodiment. In this case, the length of protrusion of the supporting piece 58 from the base portion 54 is sufficiently short relative to the width of the base portion 54 and therefore the rigidity of the supporting piece 58 is relatively high. Accordingly, there are cases where both the supporting piece 58 and the base portion 54 are simultaneously deformed by the resistance force when the vibration-proof spring is press-fitted to the holding hole. In the case of the vibration-proof spring 50, the rigidity would be high at an upright part of the spring portion 56 and thus the vibration-proof spring 50 is more likely to be bent near a line T (see FIG. 3B) that connects ends of adjacent spring portions 56. In this manner, the deformation of the base portion 54 will change the position of the spring portion 56, which is provided upright on the base portion 54 (i.e., the posture where the spring portion 56 is tilted toward the axis line of the hole 52 in order to apply the biasing force to the shaft 33). That is, variations in the biasing force by each supporting piece 58 occur and thereby the variations in the sliding load applied to the shaft 33 occur. Hence, the smooth sliding of the shaft 33 may be hindered and the shaft 33 may not be controlled as designed in the first place.

In the light of the above consideration, the vibration-proof spring 50 according to the first embodiment has the low-rigidity portion 58a for the purpose that the resistance force acting on the supporting piece 58 at the time of the press-fitting does not account for the cause of the deformation of the base portion 54. Since the rigidity of the supporting piece 58 where the low-rigidity portion 58a has been formed is lower than that of the base portion 54, the supporting piece 58 is more likely to be bent when the vibration-proof spring is press-fitted. The bending action of this low-rigidity portion 58a absorbs the resistance force at the press-fitting and can suppress the base portion 54 from being deformed.

Also, in the case of the supporting piece 58 of the vibration-proof spring 50, the low-rigidity portion 58a is formed such that a near-base part of the supporting piece 58 in the direction of extension thereof is cut out in a semicircular shape, and therefore the width of the outer edge part 58b of the supporting piece 58 does not change. As a result, the area of contact of the supporting piece 58 with the smaller-diameter part 70b of the holding hole 70 can be kept intact as designed. In other words, the formation of the low-rigidity portion 58a does not substantially alter the supporting stability of the vibration-proof spring 50.

As shown in FIGS. 2A and 2C, at the time of a bending process of the vibration-proof spring 50 (namely, before the press-fitting), the supporting piece 58 is bent, in advance, in the direction opposite to the press-fitting direction, so that the vibration-proof spring 50 can be easily positioned when the vibration-proof spring 50 is press-fitted to the smaller-diameter part 70b. The in-advance bending of the low-rigidity portion 58a can prepare for the bending action of the supporting piece 58 and thereby the bending process can be done easily through the low-rigidity portion 58a. In other words, the deformation of the base portion 54 can be further suppressed. Also, as shown in FIG. 3A, the larger-diameter part 70a and the smaller-diameter part 70b are connected continuously to each other using a tapered shape formed between them. As a result, the bending action of each low-rigidity portion 58a can be done smoothly, thereby contributing to stabilizing the fixed position of the vibration-proof spring 50 in the smaller-diameter part 70b.

Also, as shown in FIG. 3A, the smaller-diameter part 70b of the holding hole 70 is formed by a region (at a deep part side of the holding hole 70) such that said region has an approximate depth enough to hold the smaller-diameter part 70b. Thus the press-fitting work is easily done and the time required for assembling of the vibration-proof spring 50 in a press-fitted state is reduced. This can contribute to an improvement in suppressing the deformation of the base portion 54 at the time of the press-fitting. Note that, in a modification, the holding hole 70 may be formed in a straight shape having the smaller-diameter part 70b only. In such a case, an insertion work distance of the vibration-proof spring 50 in the press-fitted state will be longer but such the modification is advantageous in that the holding hole 70 can be processed more easily.

Gaseous refrigerant flows, at high speed, through the second passage 14 to which the holding hole 70 is open. Accordingly, if the vibration-proof spring 50 protrudes from the holding hole 70, which is open to the second passage 14, it may be an obstacle and may cause noise and/or vibration. In the light of this, as shown in FIG. 3A, the expansion valve 1 according to the first embodiment is configured such that depth L0 of the holding hole 70 in an axial direction of the shaft 33 is longer than or equal to length L1 of the vibration-proof spring 50 in the axial direction of the shaft 33 (L0≥L1). In other words, the depth of the holding hole 70 is determined such that the vibration-proof spring 50 does not protrude into the second passage 14.

By employing the first embodiment as described above, the low-rigidity portion 58a, whose rigidity is lower than that of the base portion 54, is preferentially bent when the vibration-proof spring 50 is press-fitted to the holding hole 70. In other words, the deformation of the base portion 54 is suppressed and therefore the position of the spring portion 56 can be kept intact. As a result, much attention to the deformation of the base portion 54, when the vibration-proof spring 50 is assembled, is no longer required and therefore the assembling workability can be improved. Also, a primary function of the vibration-proof spring, which is to apply a suitable sliding load to the shaft 33, can remain effective, thereby contributing to the quality maintenance of the expansion valve 1.

Second Embodiment

Figure 4A:
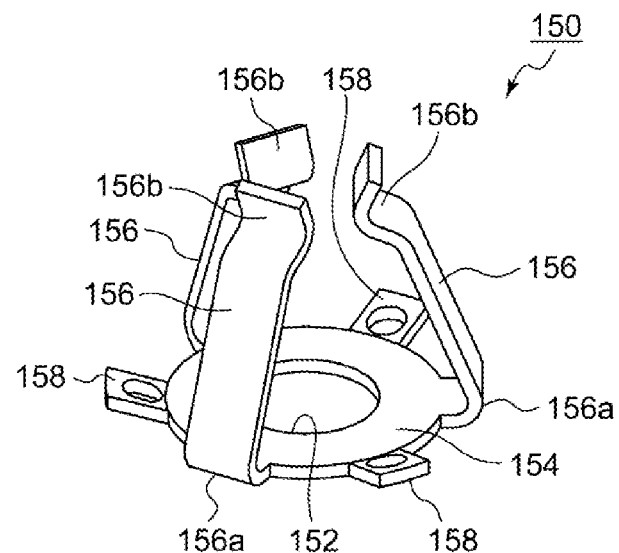
FIGS. 4A to 4C each shows a structure of a vibration-proof spring according to a second embodiment.
Figure 4B:
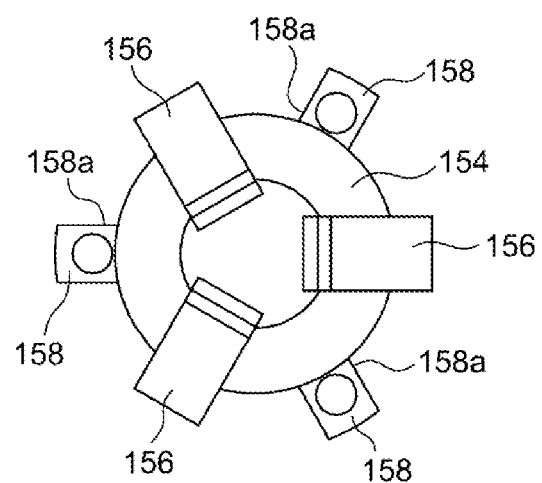
Figure 4C:
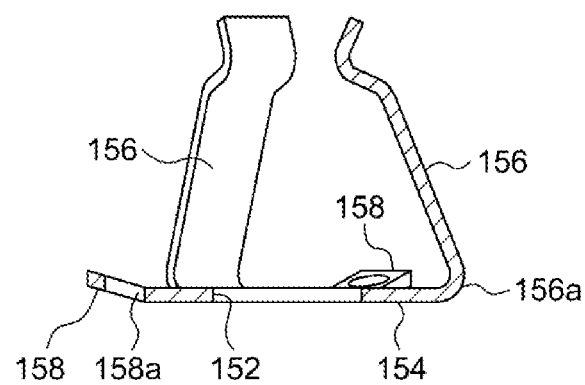

An expansion valve according to a second embodiment is similar to the first embodiment in structure and arrangement excepting that a structure of the low-rigidity portion of the supporting piece in the vibration-proof spring according to the second embodiment differs from that of the first embodiment. FIG. 4A is a perspective view showing an overall structure of a vibration-proof spring 150 according to the second embodiment. FIG. 4B is a plain view of the vibration-proof spring 150. FIG. 4C is a cross-sectional view of the vibration-proof spring 150. A basic function of the vibration-proof spring 150 according to the second embodiment is the same as the function of the vibration-proof spring 50 according to the first embodiment. Thus, the reference numerals of corresponding components in the second embodiment are replaced by 3-digit reference numerals where 100 is added to each reference numeral used in the first embodiment, and the repeated description thereof is omitted. For example, the reference numeral 56 in the spring portion 56 of the first embodiment is replaced by the reference numeral 156 in a spring portion 156 of the second embodiment. Similar to this renumbering system as used in the second embodiment, the reference numerals of corresponding components in the following third to fifth embodiments are respectively replaced by 3-digit reference numerals where 200 to 400 are respectively added to each reference numeral used in the first embodiment, and the repeated description thereof is omitted.

The vibration-proof spring 150 shown in FIGS. 4A to 4C is formed such that a low-rigidity portion 158a of a supporting piece 158 is stamped out (punched) into a predetermined shape having a circular hole. In the case of the low-rigidity portion 58a according to the first embodiment, the both sides of the supporting piece 58 are cut out in semicircular shapes. In contrast, a single circular hole is formed in the low-rigidity portion 158a according to the second embodiment. Thus, a mold used for the punching process can be simplified in the second embodiment.

In this case, too, the low-rigidity portion 158a, whose rigidity is lower than that of the base portion 154 is preferentially bent when the vibration-proof spring 150 is press-fitted to the holding hole 70. In other words, the deformation of the base portion 154 is suppressed and therefore the position of the spring portion 156 can be kept intact. As a result, much attention to the deformation of the base portion 154, when the vibration-proof spring 150 is assembled, is no longer required and therefore the assembling workability can be improved. Also, the primary function of the vibration-proof spring, which is to apply a suitable sliding load to the shaft 33, can remain effective, thereby contributing to the quality maintenance of the expansion valve 1.

Third Embodiment

Figure 5A:
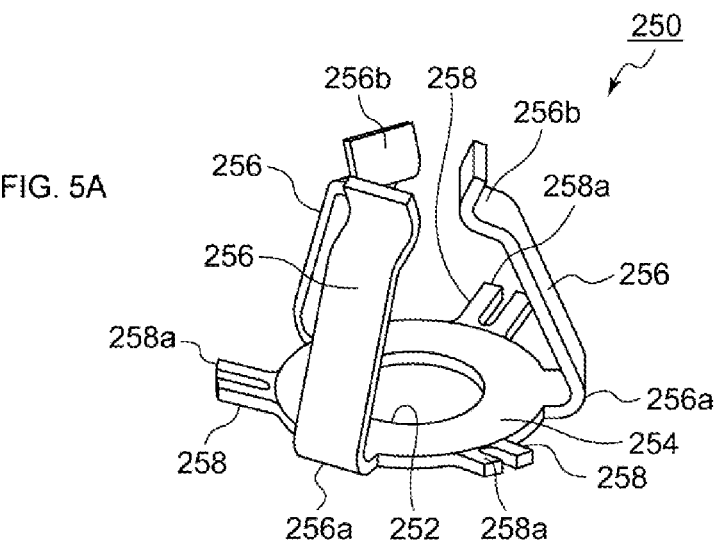
FIGS. 5A to 5C each shows a structure of a vibration-proof spring according to a third embodiment.
Figure 5B:
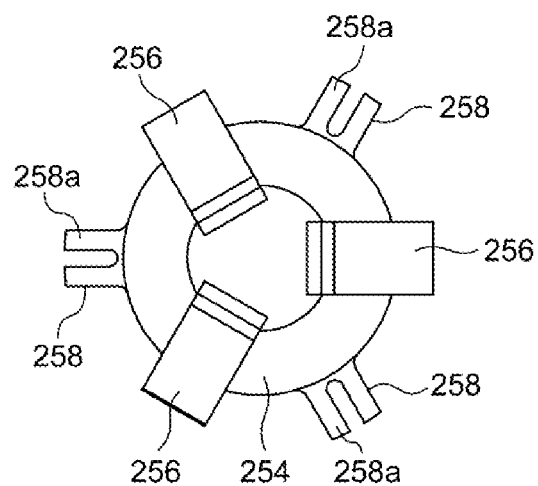
Figure 5C:
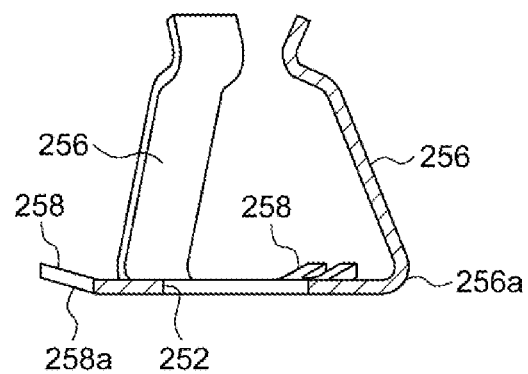

An expansion valve according to a third embodiment is similar to the first and second embodiments in structure and arrangement excepting that a structure of the low-rigidity portion of the supporting piece in the vibration-proof spring according to the third embodiment differs from those of the first and second embodiments. FIG. 5A is a perspective view showing an overall structure of a vibration-proof spring 250 according to the third embodiment. FIG. 5B is a plain view of the vibration-proof spring 250. FIG. 5C is a cross-sectional view of the vibration-proof spring 250.

The vibration-proof spring 250 shown in FIGS. 5A to 5C is achieved such that a low-rigidity portion 258a of the supporting piece 258 is formed by forming a notch (cutout section), which extends in a direction where a supporting piece 258 extends. Thus, two supporting pieces are formed. The plate width of each of the two supporting pieces perpendicular to the direction of extension thereof is narrower than that of the supporting piece 58 of the first embodiment. In this case, the plate width of the supporting piece, which is separated into two, has a narrow plate width, so that the rigidity of this supporting piece 350 is lower than that of the supporting piece that does not contain the notch in the direction of extension thereof. With this structure, when the vibration-proof spring 250 is press-fitted to the smaller-diameter part 70b, the supporting piece 258 can be easily deformed without applying an excessive load to a base portion 254 side. As a result, the deformation of the base portion 254 at the time of the press-fitting can be suppressed. Also, as compared with the case where there is provided a single supporting piece having a narrow plate width, a larger area of contact of the supporting piece 258 with a wall surface of the smaller-diameter part 70b can be ensured, so that the bearing power for the vibration-proof spring 250 can be easily ensured. Also, the supporting piece 258 is obtained by merely forming the notch extending in the direction of extension thereof. Thus, similar to the second embodiment, a mold used for the punching process can be simplified.

Fourth Embodiment

Figure 6A:
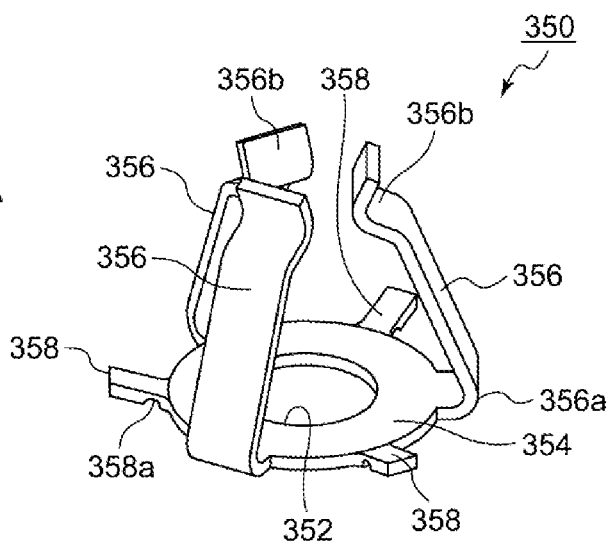
FIGS. 6A to 6C each shows a structure of a vibration-proof spring according to a fourth embodiment.
Figure 6B:
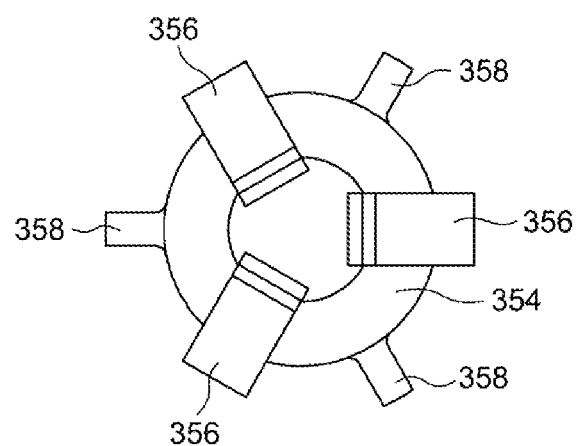
Figure 6C:
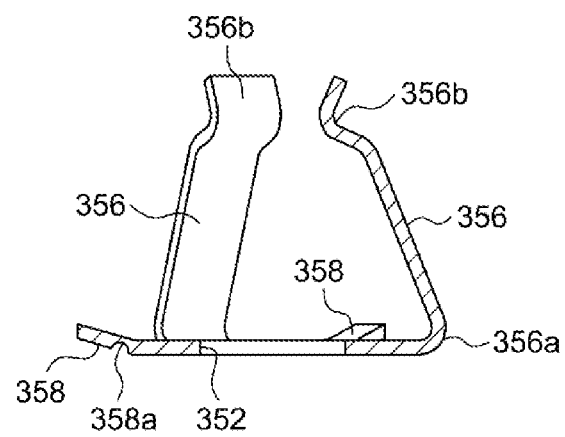

An expansion valve according to a fourth embodiment is similar to the first to third embodiments in structure and arrangement excepting that a structure of the low-rigidity portion of the supporting piece in the vibration-proof spring according to the fourth embodiment differs from those of the first to third embodiments. FIG. 6A is a perspective view showing an overall structure of a vibration-proof spring 350 according to the fourth embodiment. FIG. 6B is a plain view of the vibration-proof spring 350. FIG. 6C is a cross-sectional view of the vibration-proof spring 350.

The vibration-proof spring 350 shown in FIGS. 6A to 6C is achieved such that a low-rigidity portion 358a of a supporting piece 358 is formed in a recessed groove, in a plate width direction of the supporting piece 358, which is formed at a bottom side of the supporting piece 358 near a connection part of the supporting piece 358 and the base portion 354 (a near-base part of the supporting piece 358). In other words, the supporting member 358, which is made of a plate material, has a thin plate part whose thickness is thin along the plate width direction thereof. With this structure, when the vibration-proof spring 350 is press-fitted to the smaller-diameter part 70b, the supporting piece 358 can be easily deformed without applying an excessive load to a base portion 354 side. As a result, the deformation of the base portion 354 at the time of the press-fitting can be suppressed. FIGS. 6A to 6C show an example where the supporting piece 358 is formed such that the plate width thereof is narrower than that of the supporting piece according to each of the first to third embodiments. Also, in this example shown in FIGS. 6A to 6C, an advantageous effect of low rigidity by the recessed groove and an advantageous effect of low rigidity by a plate having a narrow width are combined together so as to achieve an overall low rigidity. In another example, the depth of the recessed groove and the groove width thereof may be adjusted while the plate width of the supporting piece 358 remains the same as that of the first embodiment, thereby achieving a similarly advantageous low rigidity. In this case, the bearing power for the vibration-proof spring 350 against the smaller-diameter part 70b can be easily ensured. Also, the supporting piece 358 is produced by merely forming the recessed groove in a direction perpendicular to the direction of extension thereof. Thus, the supporting pieces 358 can be easily formed by a press-forming and a cutting work at a stage, where the vibration-proof spring 350 is subjected to the punching process, or at an additional processing thereafter.

Fifth Embodiment

Figure 7A:
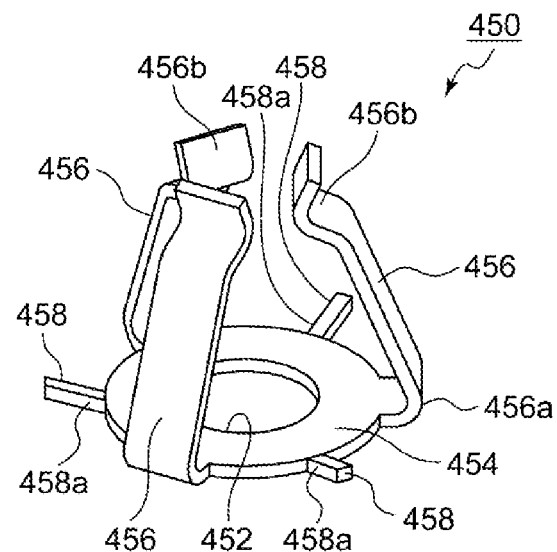
FIGS. 7A to 7C each shows a structure of a vibration-proof spring according to a fifth embodiment.
Figure 7B:
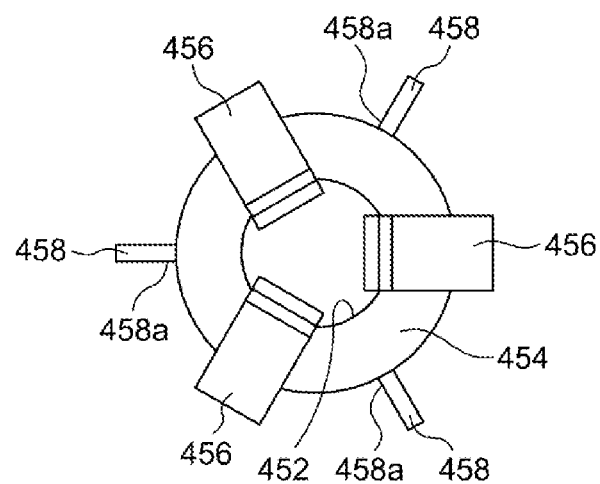
Figure 7C:
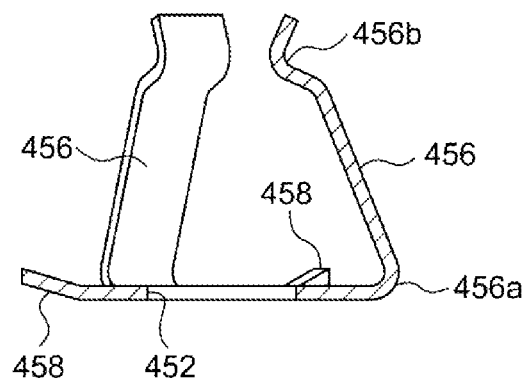

An expansion valve according to a fifth embodiment is similar to the first to fourth embodiments in structure and arrangement excepting that a structure of the low-rigidity portion of the supporting piece in the vibration-proof spring according to the fifth embodiment differs from those of the first to fourth embodiments. FIG. 7A is a perspective view showing an overall structure of a vibration-proof spring 450 according to the fifth embodiment. FIG. 7B is a plain view of the vibration-proof spring 450. FIG. 7C is a cross-sectional view of the vibration-proof spring 450.

In a supporting piece 458 shown in FIGS. 7A to 7C, a low-rigidity portion 458a is formed such that the plate width thereof in a direction perpendicular to the direction of extension thereof is narrower than that of the supporting piece 58 according the first embodiment. With this structure, when the vibration-proof spring 450 is press-fitted to the smaller-diameter part 70b, the supporting piece 458 can be easily deformed without applying an excessive load to a base portion 454 side. As a result, the deformation of the base portion 454 at the time of the press-fitting can be suppressed. Also, in this case, there is no need to provide the notch, hole, groove or the like in the supporting piece as in the previous embodiments, so that the mold and die components can be simplified and a manufacturing process can be simplified. Note that the narrower plate width of the supporting piece 458 reduces the area of contact thereof with the smaller-diameter part 70b. Thus, it would appear that the bearing power for the vibration-proof spring 450 against the smaller-diameter part 70b is lower than that of any one of the previous embodiments. In order to alleviate this, the bearing power can be supplemented by increasing the number of supporting pieces 458 formed in the vibration-proof spring 450 if the bearing power is to be raised.

The description of the present invention given above is based upon illustrative embodiments. These embodiments are intended to be illustrative only and it will be obvious to those skilled in the art that various modifications could be further developed within the technical idea underlying the present invention and that such additional modifications are also within the scope of the present invention. For example, in the above-described embodiments and modifications, part of components may be combined and part of components may be removed from each embodiment and modification.

In the above-described first to fifth embodiments, a description has been given of an example where the three spring portions 56, 156, 256, 356 and 456 are formed such that the three spring portions are spaced equally from each other and the sliding loads are applied to the shaft 33. The vibration-proof spring is in contact with the periphery of the shaft 33 at three or more points of the spring portions and thereby the shaft can be elastically supported by the vibration-proof spring in a well-balanced manner while the deflection or unevenness, which may occur at the time of insertion, is being suppressed. Thus, it is preferable that the vibration-proof spring be in contact therewith at three or more points of the spring portions. Also, the sliding load to be applied may be adjusted in a manner such that the number of spring portions formed is adjusted according to the property of a spring steel that constitutes the vibration-proof spring. When, for example, a material whose spring property is low is used, such a case can be handled and managed by increasing the number of spring portions.

Similarly, in the above-described first to fifth embodiments, a description has been given of an example where the three supporting pieces 58, 158, 258, 358 and 458 are formed such that the three supporting pieces are spaced equally from each other. The number of supporting pieces formed may be selected, as appropriate, according to a desired bearing power for the vibration-proof spring against the smaller-diameter part 70b.

Though in each embodiment a description has been given of an example where the shape of the base portion 54, 154, 254, 354 or 454 is a circular annular shape, the shape thereof may be polygonal.

In the first embodiment, the low-rigidity portion 58a is formed by a semicircular cutout section. However, the shape thereof may be selected, as appropriate, from among other shapes such as a rectangular or triangular shape, as long as the rigidity can be lowered, so that the same advantageous effects can be achieved. Similarly, in the second embodiment, the low-rigidity portion 158a is formed by a circular hole. However, the shape thereof may be selected, as appropriate, from among other shapes such as a long-hole or rectangular shape, as long as the rigidity can be lowered, so that the same advantageous effects can be achieved. Also, in the second embodiment, a description has been given of an example where a relatively large single hole is formed. However, the size of the hole and the number of holes may be selected, as appropriate, according to the degree of low rigidity. If a plurality of holes are provided, the arrangement of those holes may be selected, as appropriate, and thereby the degree of low rigidity can be adjusted and therefore the vibration-proof spring and its components can be designed more freely.

Also, in the fourth embodiment, the recessed groove of the low-rigidity portion 358a shown in FIG. 6C or the like is of a semicircular shape in cross section. However, the shape thereof may be selected, as appropriate, from among other shapes such as a rectangular or triangular shape in cross section, so that the same advantageous effects can be achieved. If a line is only drawn using a tool with a sharp angle, such as a needle, the same advantageous effects can be achieved as long as a predetermined depth and groove width can be ensured by such a line. Also, in the fourth embodiment, the low-rigidity portion 358a is formed at the bottom side of the supporting piece 358 (in a deeper position of the holding hole). However, the low-rigidity portion 358a may be formed on an upper surface side of the supporting piece 358 and the same advantageous effects can be achieved.

Also, when, in the second embodiment, the hole is formed in the supporting member 158, a predetermined mark or sign and character(s) may be used to form the hole. In this case, if the size and/or shape of the vibration-proof spring differs for each model or type, the shape of the hole can be used as an identifying mark for each model or type. Similarly, the cutout section or notch in the first embodiment or the third embodiment may be formed such that the shape thereof is used as the identifying mark. This modification can contribute to preventing the components belonging to different models from being mixed into a given model.

Also, in each of the above-described embodiments, an example has been shown where the base portion and the supporting piece in the vibration-proof spring are formed integrally with each other. In a modification, the base portion and the supporting piece may be formed separately and the supporting piece may be secured to the base portion by brazing or the like. In this case, a material used for the base portion and a material used for the supporting piece may be different from each other, so that the supporting piece having a low-rigidity portion can be easily constructed. Note that in this case the supporting piece is not limited to a plate-like one and, for example, a pin having a circular shape or the like may be used.

Also, shown in the case of FIG. 1 is the expansion valve 1 having the holding hole 70 that is open to the second passage 14. However, the position in which the holding hole is formed may be selected, as appropriately, as long as the vibration-proof spring can apply a sliding load to the shaft 33. For example, the holding hole may be formed such that there is an opening end in the first passage 13, and the same advantageous effects as that described in each of the embodiments can be attained. This modification can contribute to improving the design flexibility of the expansion valve 1. Also, a description has been given of an example where the vibration-proof spring is press-fitted to the smaller-diameter part 70b of the holding hole 70 and is thereby supported and secured inside the holding hole 70. Instead, the vibration-proof spring may be fixed and maintained in that position by a stopper, for example, so that the vibration-proof spring does not move from its setting position due to a sliding motion, vibration or the like of the shaft 33. The stopper may be, for example, a groove or protrusion formed on an inner periphery of the smaller-diameter part 70b.

Though not mentioned in the above-described embodiments, a sealing member such as an O-ring may be provided between the stepped hole 34 and the shaft 33 shown in FIG. 1 to prevent the refrigerant from being leaked from the first passage 13 to the second passage 14. More specifically, the depth of the large-diameter part 46 of the stepped hole 34 may be enlarged, an O-ring may be installed on a bottom side of the larger-diameter part 46, and the vibration-proof spring may be placed above the O-ring. In this case, the vibration-proof spring may function as a stopper that stops the O-ring from above through the medium of the bottom face thereof.

The expansion valves according to the above-described embodiments are suitably applied to and used for a refrigeration cycle where hydrochlorofluorocarbon (HFC-134a) or the like is used as the refrigerant. Also, the expansion valves according to the present embodiments and modifications may be applied to a refrigeration cycle where a refrigerant, such as carbon dioxide, whose working pressure is high is used. In such a case, an external heat-exchanger such as a gas cooler may be placed in the refrigeration cycle, instead of the condenser. In this case, a plurality of disk springs formed of a metal, for example, may be disposed in superposition for the purpose of reinforcing the diaphragm constituting the power element 3. Or alternatively, the disc springs or the like may be provided in place of the diaphragm. In the above-described embodiments, an example is described where the expansion valve is configured as a thermostatic expansion valve. However, the expansion valve according to the present embodiments may also be configured as one that does not sense the temperature. For example, the expansion valve may also be configured as an electromagnetic expansion valve that uses a solenoid as the drive section. Or alternatively, the expansion valve may also be configured as an electric expansion valve that uses an electric motor as the drive section.

What is claimed is:

1. An expansion valve configured for interfacing with an external evaporator, the expansion valve throttles and expands refrigerant introduced from an upstream side of a refrigeration cycle by allowing the refrigerant to pass through a valve section in a body so as to deliver the refrigerant to a downstream side thereof, the expansion valve comprising:
    the body having:
        a refrigerant passage, which is formed in such a manner as to run through the body, having a lead-in port of the refrigerant at one end thereof and having a lead-out port of the refrigerant at the other end thereof; and
        a valve hole provided midway along the refrigerant passage;
    a valve element configured to open and close the valve section by moving toward and away from the valve hole;
    a drive section configured to generate drive force used to open and close the valve section;
    an actuating rod, supported by the body, configured to transmit the drive force of the drive section to the valve element; and
    a vibration-proof spring, which is set between the body and the actuating rod, configured to develop a sliding resistance by biasing the actuating rod,
    the vibration-proof spring including:
        a base portion comprised of a plate having a hole, through which the actuating rod is insertable, in a central region;
        a plurality of spring portions, which are installed upright on the base portion and which are so formed as to come in contact with a periphery of the actuating rod; and
        a plurality of supporting pieces, which extend outward from the base portion and which is so formed as to be stoppable by the body,
    wherein each of the supporting pieces is structured such that the supporting piece includes a low-rigidity portion whose rigidity is lower than that of the base portion,
    wherein the low-rigidity portion is a part where a width in a direction perpendicular to a direction of extension of the supporting piece is narrower than a plate width of the base portion lateral to the hole,
    wherein the body has a holding hole that holds the vibration-proof spring, and the holding hole is a circular hole formed in a stepped shape having a larger-diameter part and a smaller-diameter part provided in a position deeper than the larger-diameter part,
    wherein the larger-diameter part has a diameter greater than or equal to an outer edge diameter between outer edge parts of the supporting pieces,
    wherein the smaller-diameter part has a diameter smaller than the diameter of the larger-diameter part, and
    wherein the smaller-diameter part has a length smaller than the larger-diameter part in a depth direction of the holding hole;
    wherein the sliding resistance in between the plurality of spring portions and the actuating rod is balanced due to a minimum deformation of the base portion when the support pieces are press-fitted into the smaller-diameter part.

2. The expansion valve according to claim 1, wherein each of the supporting pieces partially has a hole or a cut-out portion.

3. The expansion valve according to claim 1, wherein the supporting piece has a thin part whose thickness is smaller than a plate thickness of the base portion.

4. The expansion valve according to claim 1, wherein the vibration-proof spring is in contact with a periphery of the actuating rod at three or more points.

5. The expansion valve according to claim 1, wherein the expansion valve is configured as a thermostatic expansion valve which delivers the throttled and expanded refrigerant, having passed through the valve section, from the lead-out port and supplies the throttled and expanded refrigerant toward the external evaporator and which controls a valve opening degree of the valve section by sensing a pressure and a temperature of the refrigerant returned from the external evaporator,
    the expansion valve including:
        a return passage, formed separately from the refrigerant passage in such a manner as to run through the body, the return passage having the refrigerant returned from the external evaporator pass therethrough; and
        a power element, provided as the drive section, configured to be enabled upon sensing the temperature and the pressure of the refrigerant flowing through the return passage,
    wherein the actuating rod is so provided as to penetrate a dividing wall between the refrigerant passage and the return passage, and
    wherein the power element varies the valve opening degree of the valve section by transmitting the drive force to the valve element via the actuating rod.

6. The expansion valve according to claim 5, wherein the holding hole has an opening end in the return passage, and depth of the holding hole in an axial direction of the actuating rod is longer than or equal to length of the vibration-proof spring in the axial direction of the actuating rod.

* * * * *